(12) United States Patent
Yoshimura et al.

(10) Patent No.: US 12,001,324 B2
(45) Date of Patent: Jun. 4, 2024

(54) OPERATION PATTERN GENERATION APPARATUS, OPERATION PATTERN GENERATION METHOD AND PROGRAM

(71) Applicant: NIPPON TELEGRAPH AND TELEPHONE CORPORATION, Tokyo (JP)

(72) Inventors: Yu Yoshimura, Tokyo (JP); Yu Adachi, Tokyo (JP); Haruto Tanno, Tokyo (JP); Hiroyuki Kirinuki, Tokyo (JP); Toshiyuki Kurabayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 97 days.

(21) Appl. No.: 17/774,895

(22) PCT Filed: Nov. 7, 2019

(86) PCT No.: PCT/JP2019/043607
§ 371 (c)(1),
(2) Date: May 6, 2022

(87) PCT Pub. No.: WO2021/090427
PCT Pub. Date: May 14, 2021

(65) Prior Publication Data
US 2022/0405196 A1 Dec. 22, 2022

(51) Int. Cl.
*G06F 11/36* (2006.01)
*G06F 8/70* (2018.01)
*G06F 9/44* (2018.01)

(52) U.S. Cl.
CPC .......... *G06F 11/3684* (2013.01); *G06F 8/70* (2013.01); *G06F 11/3664* (2013.01); *G06F 11/368* (2013.01)

(58) Field of Classification Search
CPC ............ G06F 11/3684; G06F 11/3664; G06F 11/368; G06F 8/70
See application file for complete search history.

(56) References Cited

U.S. PATENT DOCUMENTS

| | | | |
|---|---|---|---|
| 10,176,079 B2 * | 1/2019 | Isaacs | G06F 11/368 |
| 2019/0213116 A1 * | 7/2019 | Kulkarni | G06F 11/3684 |
| 2020/0356466 A1 * | 11/2020 | Thangam | G06F 40/12 |

FOREIGN PATENT DOCUMENTS

| | | | |
|---|---|---|---|
| JP | 2006099349 A | 4/2006 | |
| JP | 2018116497 A | 7/2018 | |

OTHER PUBLICATIONS

Federico Bellucci et al., Automatic Reverse Engineering of Interactive Dynamic Web Applications to Support Adaptation across Platforms, Feb. 14-17, 2012, [Retrieved on Jan. 22, 2024]. Retrieved from the internet: <URL: https://dl.acm.org/doi/pdf/10.1145/2166966.2167004> 10 Pages (217-226) (Year: 2012).*

(Continued)

*Primary Examiner* — Anibal Rivera

(57) ABSTRACT

An operation pattern generation apparatus has a generating unit which generates, with respect to a test script to be used for a web application, operation patterns related to combinations of operation elements that cause a transition between screens of the web application and input data candidates for input elements to be used to input data on the screens, and with respect to the input element of which a default value of input data is set in advance, the generating unit combines only the default value with the operation elements in order to reduce time required for specification restoration of screen transitions of the web application.

12 Claims, 13 Drawing Sheets

(56) References Cited

OTHER PUBLICATIONS

Carlo Bellettini et al., WebUml: Reverse Engineering of Web Applications, Mar. 14-17, 2004, [Retrieved on Jan. 22, 2024]. Retrieved from the internet: <URL: https://dl.acm.org/doi/pdf/10.1145/967900.968231> 8 Pages (1662-1669) (Year: 2004).*

Kurabayashi et al. (2017) "Automatic Test Script Generation on GUI Testing" IPSJ/SIGSE Software Engineering Symposium (SES2017) Aug. 31, 2017, pp. 260-264.

* cited by examiner

Fig. 1

| LINK 1 | LINK 2 |

INPUT FORM

PULL-DOWN ▼

AAAAA
BBBBB
CCCCC

○ CHECK Y    ○ CHECK Z

SEND
BUTTON

Fig. 2

| OPERATION ELEMENT |
|---|
| LINK 1 |
| LINK 2 |
| SEND BUTTON |

| INPUT ELEMENT | INPUT DATA CANDIDATE |
|---|---|
| INPUT FORM | 111<br>222<br>333<br>☐(BLANK) |
| PULL-DOWN | AAAAA<br>BBBBB<br>CCCCC |
| CHECK BOX | CHECK Y<br>CHECK Z |

Fig. 3

| OPERATION PATTERN | OPERATION ELEMENT | INPUT FORM | PULL-DOWN | CHECK BOX |
|---|---|---|---|---|
| 1 | LINK 1 | 111 | AAAAA | CHECK Y |
| 2 | LINK 1 | 111 | AAAAA | CHECK Z |
| 3 | LINK 1 | 111 | BBBBB | CHECK Y |
| .. | .. | .. | .. | .. |
| X | LINK 2 | 333 | AAAAA | CHECK Y |
| .. | .. | .. | .. | .. |
| N | SEND BUTTON | ☐(BLANK) | CCCCC | CHECK Z |

Fig. 11

```
<html>
<body>
<form action="hoge1/hoge1" method="POST">
<input type="text">
<input type="submit" value="SEND BUTTON A">
</form>
<form action="hoge2/hoge2" method="POST">
<select>
<option value="AAAAA">AAAAA</option>
<option value="BBBBB">BBBBB</option>
<option value="CCCCC">CCCCC</option>
</select>
<input type="submit" value="SEND BUTTON B">
</form>
</body>
</html>
```

INPUT FORM

PULL-DOWN
AAAAA
BBBBB
CCCCC

SEND BUTTON A

○ CHECK Y  ○ CHECK Z

SEND BUTTON B

} VALUES OF INPUT FORM AND PULL-DOWN ARE TRANSMITTED WHEN "SEND BUTTON A" IS DEPRESSED.

} VALUE OF CHECK BOX IS TRANSMITTED WHEN "SEND BUTTON B" IS DEPRESSED.

OPERATION PATTERN GENERATION APPARATUS, OPERATION PATTERN GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/043607, filed on 7 Nov. 2019, the disclosure of which is hereby incorporated herein by reference in its entirety.

TECHNICAL FIELD

The present invention relates to an operation pattern generation apparatus, an operation pattern generation method, and a program.

BACKGROUND ART

In recent software development settings, development styles that involve releasing a plurality of new versions within a short period of time are being increasingly adopted in order to accommodate diversifying consumer needs. Software is released through steps which may be roughly divided into "designing", "implementation", and "testing". A testing step of checking normality of developed software is an operation to detect defects in the software prior to its release and correct such defects. Since the testing step involves checking the normality of software from various perspectives, the testing step is an important and inevitably time-consuming operation.

As one test perspective in the testing step, a function test is performed to check whether or not a web application that is a test object operates as intended by a designer. While the function test can be further divided into several perspectives to be checked, a problem with the function test is that it takes an immense amount of time to conduct a test related to screen transitions (hereinafter, referred to as a "screen transition test").

The screen transition test is a test to check, when performing any operation on any screen, whether or not a screen that is displayed next is as intended by the designer. The screen transition test takes time because, since operations related to all screen transitions of an application must be carried out in an exhaustive manner, a large number of operations requiring manual intervention such as click operations of links and buttons and entering data into input forms and the like must be performed.

Conventionally, as a method of reducing time required for the screen transition test, there is a method of utilizing a test script. In this method, test procedures are described as a test script having a specific format, and by having a tool read the test script, browser operations are automatically performed according to the procedures described in the test script and a test is performed. According to this method, manual operations when performing a screen transition test can be significantly reduced.

However, creating a test script for automatically performing browser operations requires comprehending specifications of the web application that is an object and learning notation of the script. In addition, work to create the script itself also takes a long time. Furthermore, since a change made to existing functions of the web application renders an existing test script useless, the test script must be corrected every time a specification change of the application is made.

Generally, it is said that an operation reduction effect of a testing step equal to or exceeding the time required for creating a test script can only be achieved when an automatic test using the test script is iteratively performed three or more times.

In order to solve such problems, there is a reverse-based test script automatic generation technique (hereinafter, referred to as a "reverse-based test technique") in which specification information is restored by causing a web application that is a test object to be automatically operated and a test script is automatically generated from the restored specification information (PTL 1, NPL 1). According to the reverse-based test technique, automation of a screen transition test can be realized without having to perform test script creation work involving manual intervention.

In the reverse-based test technique, processing is performed along the following steps when restoring specifications.

(1) Acquire a screen structure (DOM structure of HTML) of an operation object screen.
(2) Acquire information on objects that can be operated such as buttons and links (hereinafter, referred to as "operation elements") and objects to which data is to be entered such as input forms, check boxes, and radio buttons (hereinafter, referred to as "input elements") from the acquired DOM structure.
(3) When designation by the user (hereinafter, referred to as "screen input value assistance") has been performed with respect to data to be input to the input elements, adopt data designated by the user as a candidate (hereinafter, referred to as an "input data candidate") of data to be input to a form during an automatic screen operation. When screen input value assistance is not performed, create input data candidates in accordance with predetermined rules (in the case of check boxes, radio buttons, or the like, all individual options and the like).
(4) Create operation patterns by combining the generated input data candidates with operation elements.
(5) Continue automatic operation of the same screen until the determined operation patterns are used up to restore specifications.

Hereinafter, an example of operation patterns when a screen that is an operation object is as shown in FIG. 1 will be described.

In procedures (1) to (3) described above, three operation elements (a link 1, a link 2, and a send button) are acquired and input data candidates are selected with respect to four input forms (it is assumed that four values have been designated by screen input value assistance), three pull-downs, and two check boxes (refer to FIG. 2).

In procedure (4), operation elements and input data candidates are combined to determine operation patterns (refer to FIG. 3).

In procedure (5) 5, the created operation patterns are sequentially used up until a predetermined number of attempts is reached.

CITATION LIST

Patent Literature

[PTL 1] Japanese Patent Application Laid-open No. 2018-116497

Non Patent Literature

[NPL 1] Toshiyuki Kurabayashi, Muneyoshi Iyama, Hiroyuki Kirinuki, Haruto Tanno: "Automatic Test Script Generation on GUI Testing", Proceedings of the IPSJ/SIGSE Software Engineering Symposium (SES 2017), pp. 260-264, September 2017.

SUMMARY OF THE INVENTION

Technical Problem

According to the algorithm described above, the reverse-based test technique enables specification information related to screen transitions to be restored by following one screen of the web application that is an object after another while automatically operating the screens. However, since operation patterns are calculated based on combinations of the operation elements and the input data candidates, there is a problem in that an enormous number of operation patterns are created and a long period of time is required for the automatic operation of screens for specification restoration.

It is conceivable that these operation patterns include many operations that do not contribute toward specification restoration of screen transitions. Supposing that the screen shown in FIG. 1 has specifications shown in FIG. 4 described below, even though specifications of screen transitions can be restored by a minimum of four operations, a conventional reverse-based test technique may sometimes involve performing several tens of operation patterns.

As a countermeasure against this problem, an upper limit value may conceivably be set. For example, methods such as sampling some values designated by screen input value assistance according to an upper limit value when there are a plurality of such values and selecting some derived operation patterns and using the selected operation patterns to analyze the application can be readily realized. Such methods can be used to reduce time of analysis itself that is required for specification restoration.

However, reducing the number of operation patterns by simply using an upper limit value may possibly result in omitting operation patterns that are essentially required for specification restoration of screen transitions and may cause a bias in operations. Therefore, only operations with a high probability of not being linked to specification restoration must be determined and removed from the automatic operation of screens.

The present invention has been made in consideration of the points raised above and an object thereof is to reduce the time required for specification restoration of screen transitions of a web application.

Means for Solving the Problem

In order to solve the problem described above, an operation pattern generation apparatus has a generating unit which generates, with respect to a test script to be used for a web application, operation patterns related to combinations of operation elements that cause a transition between screens of the web application and input data candidates for input elements to be used to input data on the screens, wherein with respect to the input element of which a default value of input data is set in advance, the generating unit combines only the default value with the operation elements.

Effects of the Invention

The time required for specification restoration of screen transitions of a web application can be reduced.

BRIEF DESCRIPTION OF DRAWINGS

FIG. 1 is a diagram showing an example of a screen that is an operation object for describing an operation pattern example.

FIG. 2 is a diagram showing an example of information obtained by procedures (1) to (3).

FIG. 3 is a diagram showing an example of information obtained by a procedure (4).

FIG. 11 is a diagram for explaining data to be transmitted by a depression of a button.

DESCRIPTION OF EMBODIMENTS

Figure 4:
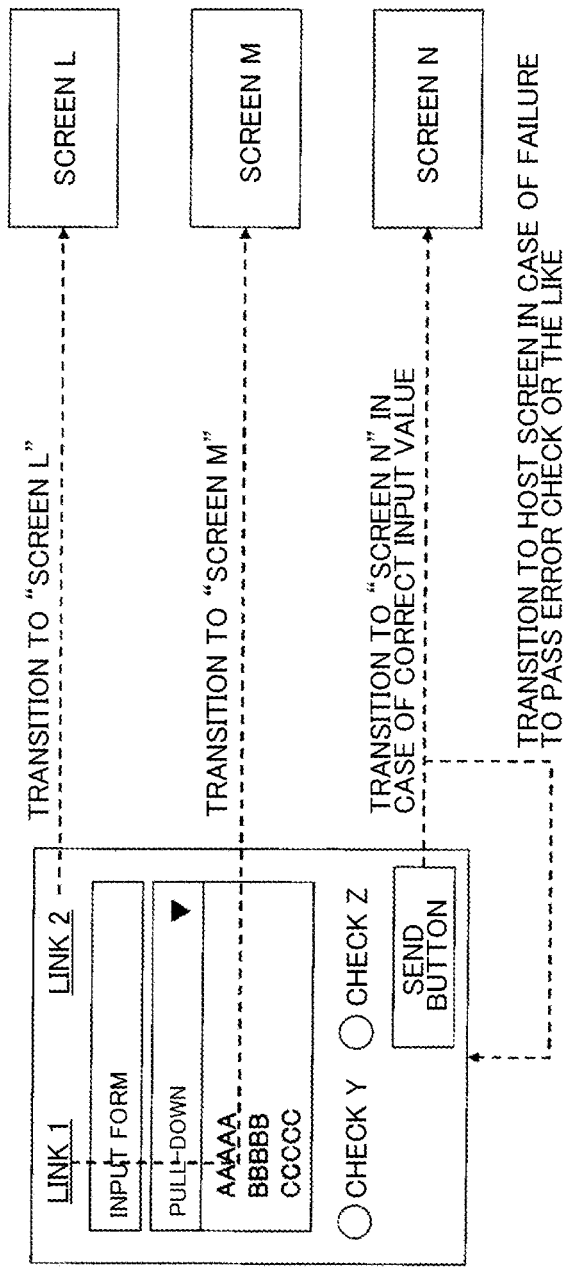
FIG. 4 is a diagram showing an example of specifications of a screen that is an operation object.
Figure 5:
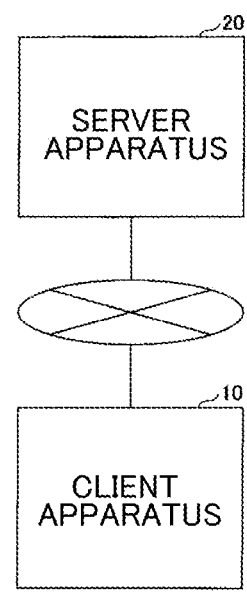
FIG. 5 is a diagram showing an example of a system configuration according to an embodiment of the present invention.

Hereinafter, an embodiment of the present invention will be described with reference to the drawings. FIG. 5 is a diagram showing an example of a system configuration according to the embodiment of the present invention. In FIG. 5, a server apparatus 20 and a client apparatus 10 are connected to each other via a network such as a LAN (Local Area Network) or the Internet.

The server apparatus 20 is constituted by one or more computers including a system being a test object including a web application.

The client apparatus 10 is an apparatus for assisting a test (verification) with respect to the web application included in the server apparatus 20.

Figure 6:
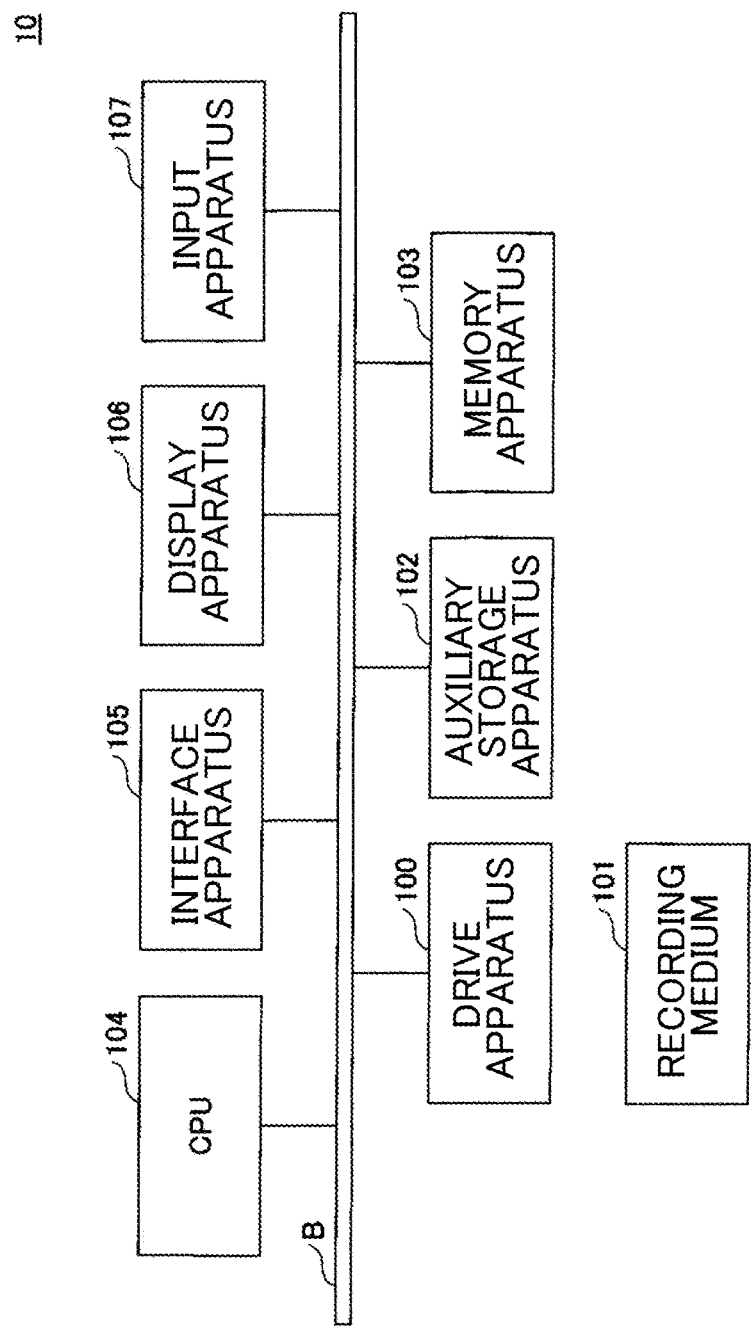
FIG. 6 is a diagram showing an example of a hardware configuration of a client apparatus 10 according to the embodiment of the present invention.

FIG. 6 is a diagram showing an example of a hardware configuration of the client apparatus 10 according to the embodiment of the present invention. The client apparatus 10 shown in FIG. 6 has a drive apparatus 100, an auxiliary storage apparatus 102, a memory apparatus 103, a CPU 104, an interface apparatus 105, a display apparatus 106, an input apparatus 107, and the like which are mutually connected by a bus B.

A program that realizes processing by the client apparatus 10 is provided by a recording medium 101 that is a CD-ROM or the like. When the recording medium 101 storing the program is set to the drive apparatus 100, the program is installed from the recording medium 101 to the auxiliary storage apparatus 102 via the drive apparatus 100. However, the program need not necessarily be installed from the recording medium 101 and, alternatively, the program may be downloaded by another computer via a network. The auxiliary storage apparatus 102 stores the installed program as well as necessary files, data, and the like.

When an instruction to run the program is issued, the memory apparatus 103 reads out the program from the auxiliary storage apparatus 102 and stores the program. The CPU 104 realizes functions related to the client apparatus 10 in accordance with the program stored in the memory apparatus 103. The interface apparatus 105 is used as an interface for connecting to a network. The display apparatus 106 displays a GUI (Graphical User Interface) or the like according to the program. The input apparatus 107 is constituted by a keyboard and a mouse or the like and is used to enable various operation instructions to be input.

Figure 7:
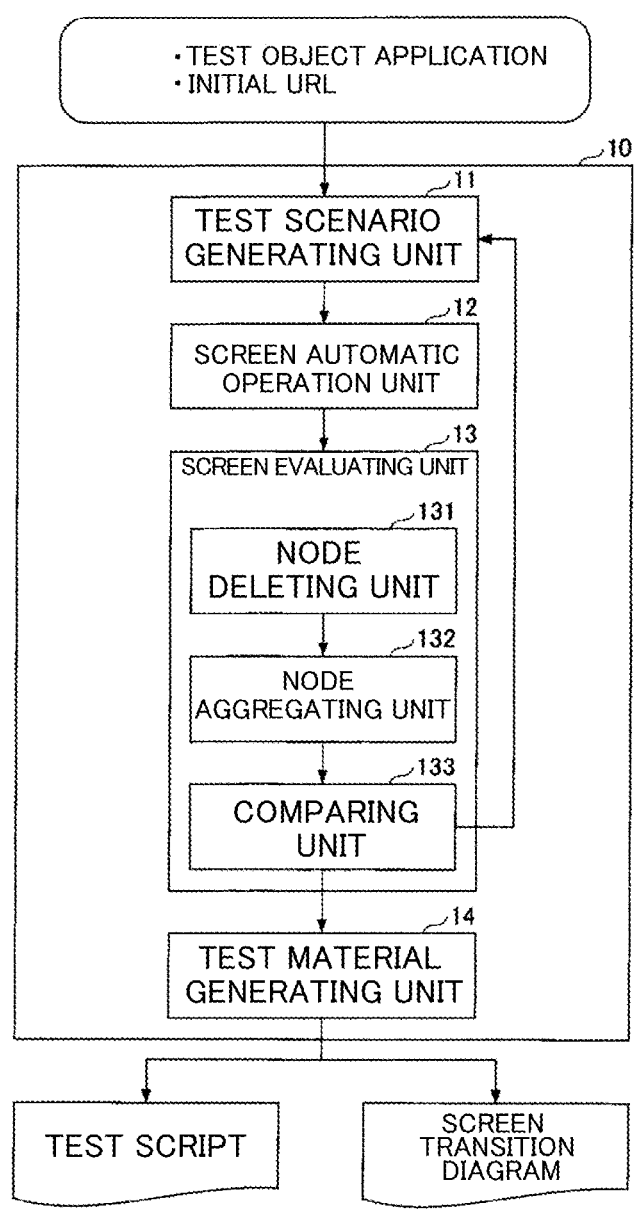
FIG. 7 is a diagram showing an example of a functional configuration of the client apparatus 10 according to the embodiment of the present invention.

FIG. 7 is a diagram showing an example of a functional configuration of the client apparatus 10 according to the embodiment of the present invention. In FIG. 7, the client apparatus 10 has a test scenario generating unit 11, a screen automatic operation unit 12, a screen evaluating unit 13, a test material generating unit 14, and the like. The respective units are realized by processing that one or more programs installed on the client apparatus 10 causes the CPU 104 to execute.

The test scenario generating unit 11 generates a test scenario and a test input value with respect to each screen displayed in a test.

The screen automatic operation unit 12 realizes a dynamic analysis by automatically executing screen operations using the generated test scenario and test input value as a test case.

The screen evaluating unit 13 determines, using information on a URL, HTML, or the like, whether or not a screen to which a transition is made by executing a screen operation is a screen to which a transition has already been made. The screen evaluating unit 13 performs editing processing for respectively abstracting HTML data of a screen to which a transition is made by executing a screen operation and HTML data of a screen to which a transition has already been made and compares the pieces of edited HTML data with each other.

In FIG. 7, the screen evaluating unit 13 includes a node deleting unit 131, a node aggregating unit 132, and a comparing unit 133. The node deleting unit 131 executes deletion of nodes related to cause 1 described above as a part of the editing processing described above. The node aggregating unit 132 executes aggregation of nodes related to cause 2 described above as a part of the editing processing described above. The comparing unit 133 compares two HTMLs having been abstracted by the editing processing such as the deletion of nodes and the aggregation of nodes with each other to determine identity of screens related to the two HTMLs.

The test material generating unit 14 generates a screen transition diagram based on information obtained by a static analysis and a dynamic analysis. The test material generating unit 14 also outputs, in a format of a test script, the test scenario and the test input value generated by the test scenario generating unit 11.

Functions of the respective units and processing procedures executed by the respective units in FIG. 7 are as disclosed in PTL 2. However, functions of the test scenario generating unit 11 have been expanded in the present embodiment.

Figure 8:
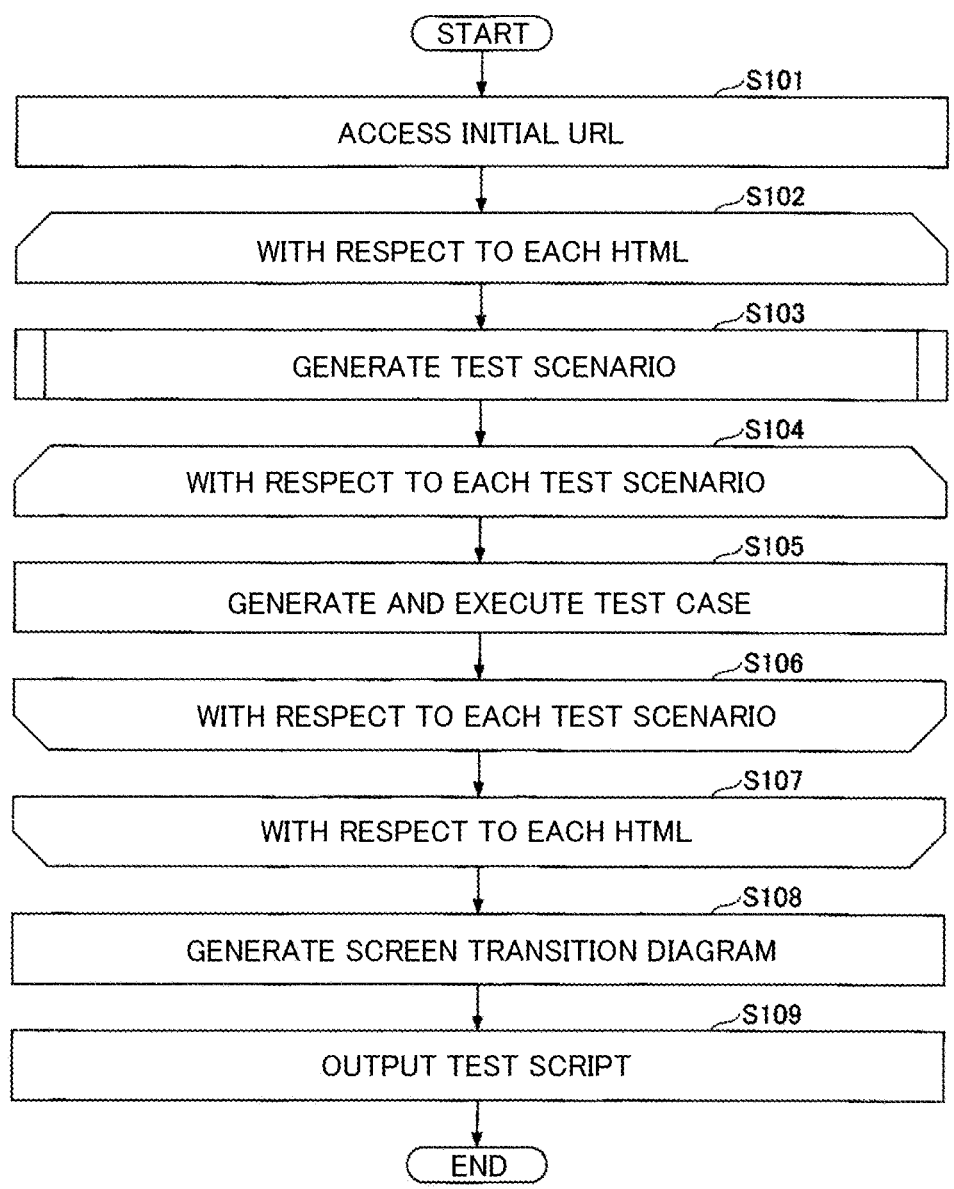
FIG. 8 is a flow chart for explaining an example of processing procedures to be executed by the client apparatus 10.

Hereinafter, processing procedures to be executed by the client apparatus 10 will be described. FIG. 8 is a flow chart for explaining an example of processing procedures to be executed by the client apparatus 10. The processing procedures shown in FIG. 8 are basically the same as the processing procedures shown in FIG. 6 in PTL 2.

In step S101, the screen automatic operation unit 12 accesses an initial URL and acquires HTML data and the like that correspond to the initial URL. As a result, a screen based on the HTML data and the like is displayed on the display apparatus 106. For example, the initial URL may be input by a user or may be stored in the auxiliary storage apparatus 102 in advance.

In subsequent steps S102 to S107, a dynamic analysis and the like are executed with respect to the HTML data that corresponds to the initial URL and all pieces of HTML data to which a transition can be made from the screen related to the HTML data as a point of origin. Specifically, as the dynamic analysis, a screen operation that is a test object is actually automatically performed with the screen that corresponds to the initial URL as a point of origin. In the dynamic analysis, screen operations are repeated by clicking all links on each screen, and when there is an input form and a submit button corresponding to the input form, generating a test input value with respect to a request in a case where the submit button is pressed. A screen that is a transition destination is compared with a screen to which a transition has already been made to determine whether or not the screen that is a transition destination is a screen to which a transition is newly made and the number of reached screens is counted. Due to the dynamic analysis described above, a connection between information (HTML, URL, and the like) of a transition destination screen and a screen and means for reaching the screen are acquired. In addition, when a screen transition that does not involve a controller is discovered in the dynamic analysis, information on the screen transition is also added. A screen transition that does not involve a controller is, for example, a screen transition that occurs when a link defined by an <a> tag is clicked. The controller refers to a portion that determines processing to be executed with respect to a request from a client side in a configuration of MVC (Model View Controller) that is a design pattern generally used in web applications. For example, a servlet is an example of a controller.

Hereinafter, HTML data that is considered a processing object in steps S102 to S107 will be referred to as an "object HTML".

In step S103, the test scenario generating unit 11 generates a test scenario with respect to a screen (hereinafter, referred to as an "object screen") related to the object HTML. In other words, for each screen element (an operation element, an input element, or the like) that causes a screen transition on the object screen, a test scenario constituted by a pair of an operation and a locator is generated. The operation is an operation such as a click. The locator refers to identification information of a screen element that is an object of the operation.

Subsequent steps S104 to S106 are executed for each test scenario generated in step S103. The test scenario that is a processing object in steps S104 to S106 will be hereinafter referred to as an "object test scenario".

In step S105, the test scenario generating unit 11 generates a test case based on the object test scenario and the screen automatic operation unit 12 executes the test case with respect to the object screen. As a result, a screen transition occurs. When the object test scenario requires an input value, a test input value is generated in step S105.

Once steps S102 to S107 have been executed with respect to all screens (HTMLs) that are transition destinations, the test material generating unit 14 generates a screen transition diagram (S108). Specifically, the test material generating unit 14 generates a screen transition diagram indicating screen transitions that have actually occurred in steps S102 to S107 (refer to FIG. 7 in PTL 2).

Next, the test material generating unit 14 outputs, in a format of a test script, the test scenario and the test input value at the time of occurrence of each screen transition (S109).

Among the processing procedures shown in FIG. 8, in the present embodiment, processing contents of step S102 are expanded in order to reduce time required for specification restoration by exhaustive screen operations in accordance with a reverse-based test technique of a web application. Since simply reducing the number of patterns in which a single screen (a web page) is operated may possibly prevent specification restoration from being performed, a mechanism for discriminating operations that do not contribute toward specification restoration is required. Since the reverse-based test technique creates an operation pattern based on a combination of an operation element and an input data candidate (an input value) to be entered in an input element, the present embodiment adopts an approach that reduces analysis time by utilizing characteristics of the operation element and the input element to determine operations that do not contribute toward specification restoration and removing such operations from the operation patterns.

Operation elements (links and buttons) and input elements which the present embodiment focuses on with respect to a screen (a web page) of a web application will be described below.

[Operation Elements]
<Link>
  Description: When a link is depressed, a web browser accesses (transmits a request (HTTP request) to) a designated resource (URL). In the access, only processing for calling a next screen is performed and data is hardly transmitted. When data transmission is to be performed, specific information is added as a parameter to an end of the URL (a query string).
  HTML description example: <a href="hoge/hoge?param=ZZZ">link</a>
<Button>
  Description: When a button is depressed, the web browser transmits a request (HTTP request) to a resource (URL) having designated data entered in a related input element.
  HTML description example: <input type="submit" value="transmit">
[Input Elements]
<Text Box, Radio Button, Pull-Down, and the Like>
  Description: Data is input to an input element by free description or by an operation such as a selection from a list. A default value can be set to each input element (a screen is displayed in a state where a check box has been selected or a state where characters have been input to a text box.
  HTML description example (text box): <input type="text" value="default value">

In the present embodiment, by using the characteristics described above, the number of operation patterns is reduced without decreasing accuracy of specification restoration in a reverse-based test. Hereinafter, in order to demonstrate a specific reduction method, details of step S103 will be described.

Figure 9:
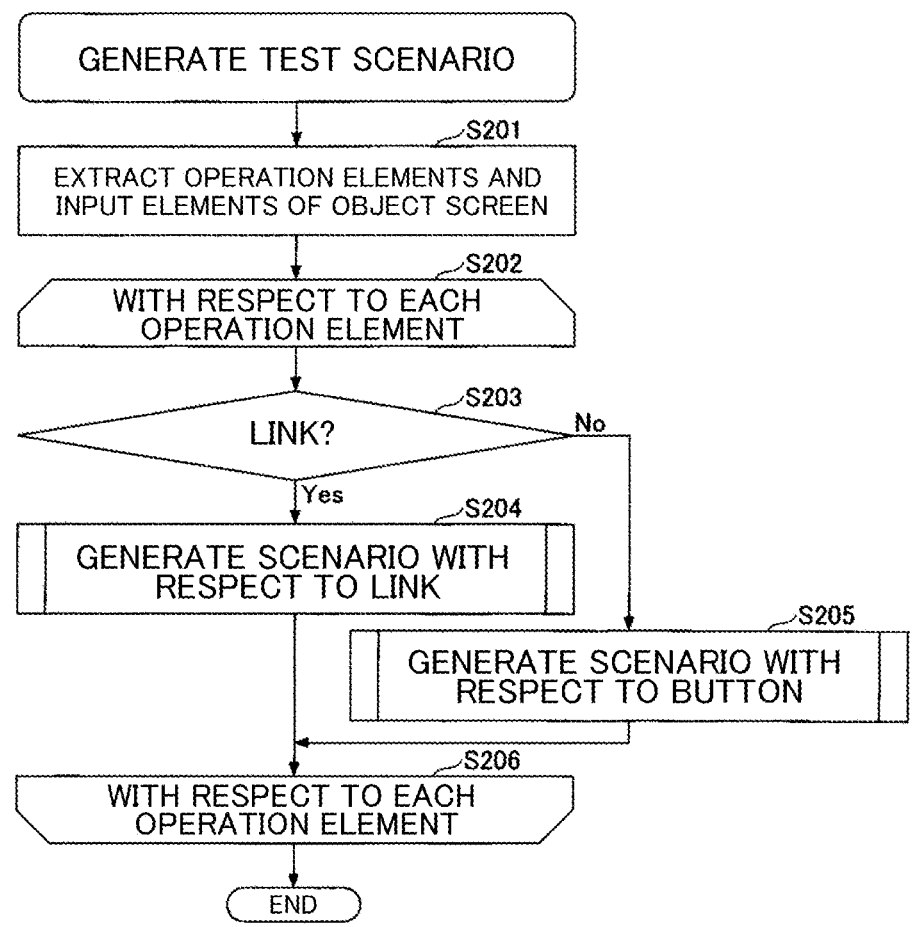
FIG. 9 is a flow chart for explaining an example of processing procedures of generation processing of a test scenario.

FIG. 9 is a flow chart for explaining an example of processing procedures of generation processing of a test scenario.

In step S201, the test scenario generating unit 11 extracts all operation elements and all input elements included in an object screen based on an object HTML.

In subsequent steps S202 to S206, steps S203 to S205 are executed for each extracted operation element. An operation element that is a processing object in steps S203 to S205 will be referred to as an "object operation element".

In step S203, the test scenario generating unit 11 determines whether or not the object operation element is a link based on the object HTML. When the object operation element is a link (Yes in S203), the test scenario generating unit 11 executes generation processing of a test scenario with respect to a link (S204). On the other hand, when the object operation element is not a link (No in S203), the test scenario generating unit 11 executes generation processing of a test scenario with respect to a button (S205).

Next, details of step S204 will be described. A link has a function of accessing a specific resource and cases where data set to an input element on the screen is used are rare. A query string is used when performing data transmission.

While a query string refers to a method of adding a parameter to an end of a transition destination URL in a form of "?"+"key=value", since there are various implementation methods of determining an input element of which data set thereto is to be transmitted and since a key name can also be freely determined by an implementor, it is difficult to mechanically specify which data is to be transmitted.

In consideration thereof, in the present embodiment, when a query string is set to a link, the test scenario generating unit 11 generates exhaustive operation patterns in a similar manner to a conventional analysis of a reverse-based test and uses the generated operation patterns in an analysis. On the other hand, when a query string has not been added, since data transmission is not performed, entry of data to an input element does not conceivably contribute toward specification restoration. Therefore, when a query string has not been set, operation patterns are reduced by not performing data entry to the input element (by not combining the input element with any input data candidate). Specifically, in step S204, the test scenario generating unit 11 executes processing procedures shown in FIG. 10.

Figure 10:
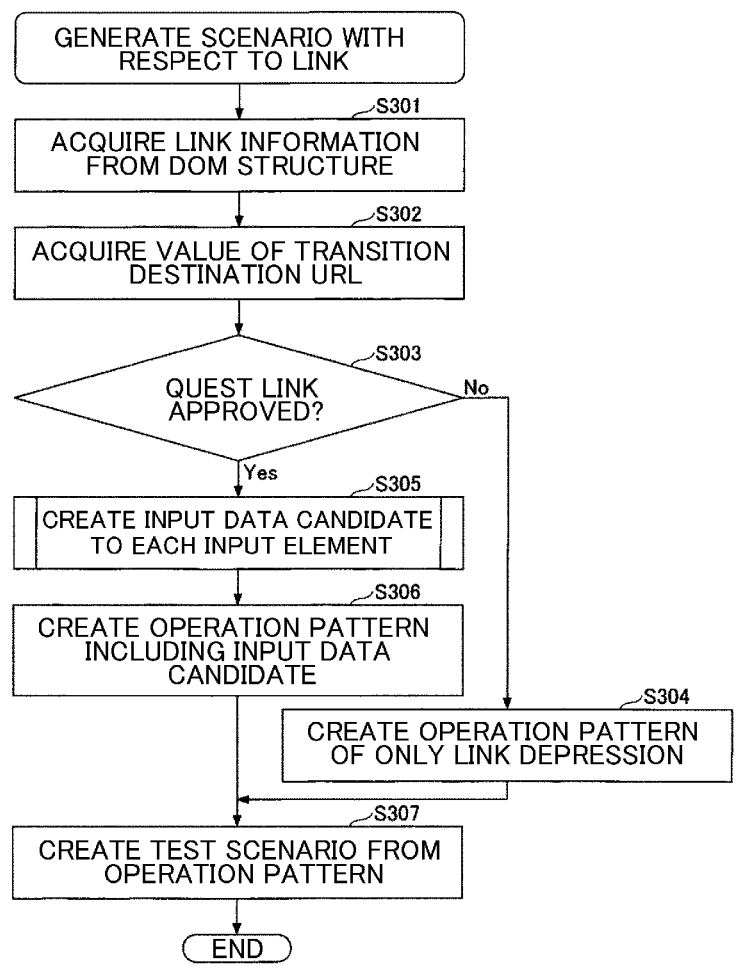
FIG. 10 is a flow chart for explaining an example of processing procedures of generation processing of a test scenario with respect to a link.

FIG. 10 is a flow chart for explaining an example of processing procedures of generation processing of a test scenario with respect to a link. Hereinafter, a link that is a processing object in step S204 will be referred to as an "object link".

In step S301, the test scenario generating unit 11 acquires information (<a> tag, <area> tag, or the like) related to the object link from the DOM structure of an object screen (object HTML). Next, the test scenario generating unit 11 acquires a value of a transition destination URL (a value of an href attribute or the like) set to the <a> tag acquired in step S301 (S302).

Next, the test scenario generating unit 11 determines whether or not the query string is set to (included in) a character string of the transition destination URL (S303). Whether or not the query string is set to the transition destination URL can be determined based on, for example, whether or not the character string (a value of the href attribute or the like) of the transition destination URL is in a format of "?xxx=xxx". For example, when the <a> tag related to the object link is, <a href="hoge/hoge?param=ZZZ">link</a>, it is determined that the query string is set to (included in) the character string of the transition destination URL.

When the query string has not been set (No in S303), without associating any of the input elements with the object link (without combining the object link with an input data candidate of any of the input elements), the test scenario generating unit 11 creates an operation pattern (generates an operation pattern that simply involves depressing the object link without entering data to input elements) (S304).

On the other hand, when the query string has been set (Yes in S303), the test scenario generating unit 11 executes generation processing of input data to each input element on the object screen (S305). Details of step S305 will be described later. Next, the test scenario generating unit 11 generates an operation pattern based on a combination of the object link and the input data candidate generated in step S305 (S306).

After step S304 or S306, the test scenario generating unit 11 generates a test scenario based on the generated operation pattern (S307).

Next, details of step S205 shown in FIG. 9 will be described. When a button is depressed, data of a plurality of input elements on a same screen as the button is simultaneously transmitted to a server. However, data of all input elements on the same screen is not necessarily transmitted and only input elements related to the depressed button are to be an object of data transmission.

FIG. 11 is a diagram for explaining data to be transmitted by a depression of a button. In the case of FIG. 11, values set to two input elements, an input form and a pull-down, are transmitted when a "send button A" is depressed and a value set to a check box is transmitted when a "send button B" is depressed. Which input element has data to be an object of transmission is determined based on a form tag. In a structure of a DOM tree, values (input data) of input elements included between a start tag (<form>) and an end tag (</form>) of a form tag that exists on a higher level than a button tag (in other words, input elements in a form to which the button belongs) are to be objects of transmission. In other words, since input elements outside the form tag are not objects of transmission, entry of data to such input elements do not conceivably contribute toward specification restoration.

In consideration thereof, in the present embodiment, the test scenario generating unit 11 reduces the number of operation patterns by specifying input elements of which input data is to be a transmission object when an operation object button is depressed and adopting only the specified input elements as objects of data entry. Specifically, in step S205, the test scenario generating unit 11 executes processing procedures shown in FIG. 12.

Figure 12:
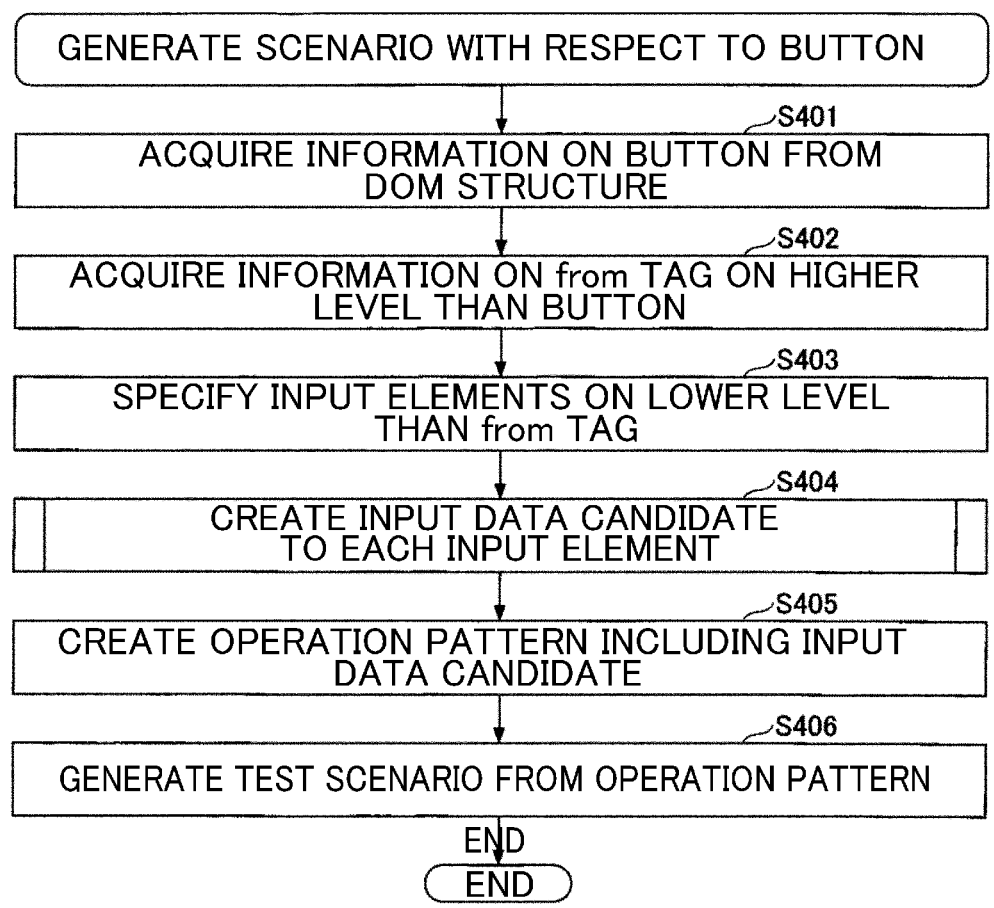
FIG. 12 is a flow chart for explaining an example of processing procedures of generation processing of a test scenario with respect to a button.

FIG. 12 is a flow chart for explaining an example of processing procedures of generation processing of a test scenario with respect to a button. Hereinafter, a button that is a processing object in step S204 will be referred to as an "object button".

In step S401, the test scenario generating unit 11 acquires information (<button> tag, <input type="button"> tag, or the like) related to the object button from the DOM structure of an object screen (object HTML). Next, in the object HTML, the test scenario generating unit 11 acquires information on a form tag (information on a form element) that is positioned on a higher level than the object button (S402).

Next, the test scenario generating unit 11 specifies input elements that exist between a start tag (<form>) and an end tag (</form>) of the form tag (the form element) (S403). Next, the test scenario generating unit 11 executes generation processing of an input data candidate with respect to only the specified input elements (S404). Details of step S404 will be described later.

Next, the test scenario generating unit 11 generates an operation pattern based on a combination of the object button and the input data candidate generated in step S404 (S405). Next, the test scenario generating unit 11 generates a test scenario based on the generated operation pattern (S406).

Next, details of step S305 shown in FIG. 10 and step S404 shown in FIG. 12 will be described.

In a conventional reverse-based test technique, when there is a value having been designated by a user's assistance (screen input value assistance) with respect to data to be entered to an input element, the value is adopted as an input data candidate, but when a value has not been designated, an input data candidate is generated in accordance with a predetermined rule. Examples of rules that can be used as the predetermined rule include "check individual elements one by one" and "only check a top element" in the case of a check box and "generate a plurality of random character strings" in the case of a text box. However, in any case, there is a possibility that the number of operation patterns may increase or an omission of operation patterns necessary for a screen transition may occur.

On the other hand, in order to reduce a data input operation by the user, a default value is often set to an input element. For example, when opening a member information change screen of an e-commerce site or the like, the screen is often set up to be in a state where pieces of member information such as a name and an address that are presently registered are already input to the input element and the user need only rewrite the pieces of information that needs to be changed. In this manner, when data to be input is known or a value with a high probability of being input is specified, the value is adopted as a default value in an initial state. In other words, when a default value is set to the input element, conceivably, it is highly likely that the default value is data necessary to make a transition to a next screen.

In consideration thereof, in the present embodiment, when a default value is set to an input element, the test scenario generating unit 11 reduces the number of operation patterns by adopting only the default value as an input data candidate without generating new input data candidates according to the predetermined rule. Specifically, in step S305 shown in FIG. 10 and step S404 shown in FIG. 12, the test scenario generating unit 11 executes processing procedures shown in FIG. 13.

Figure 13:
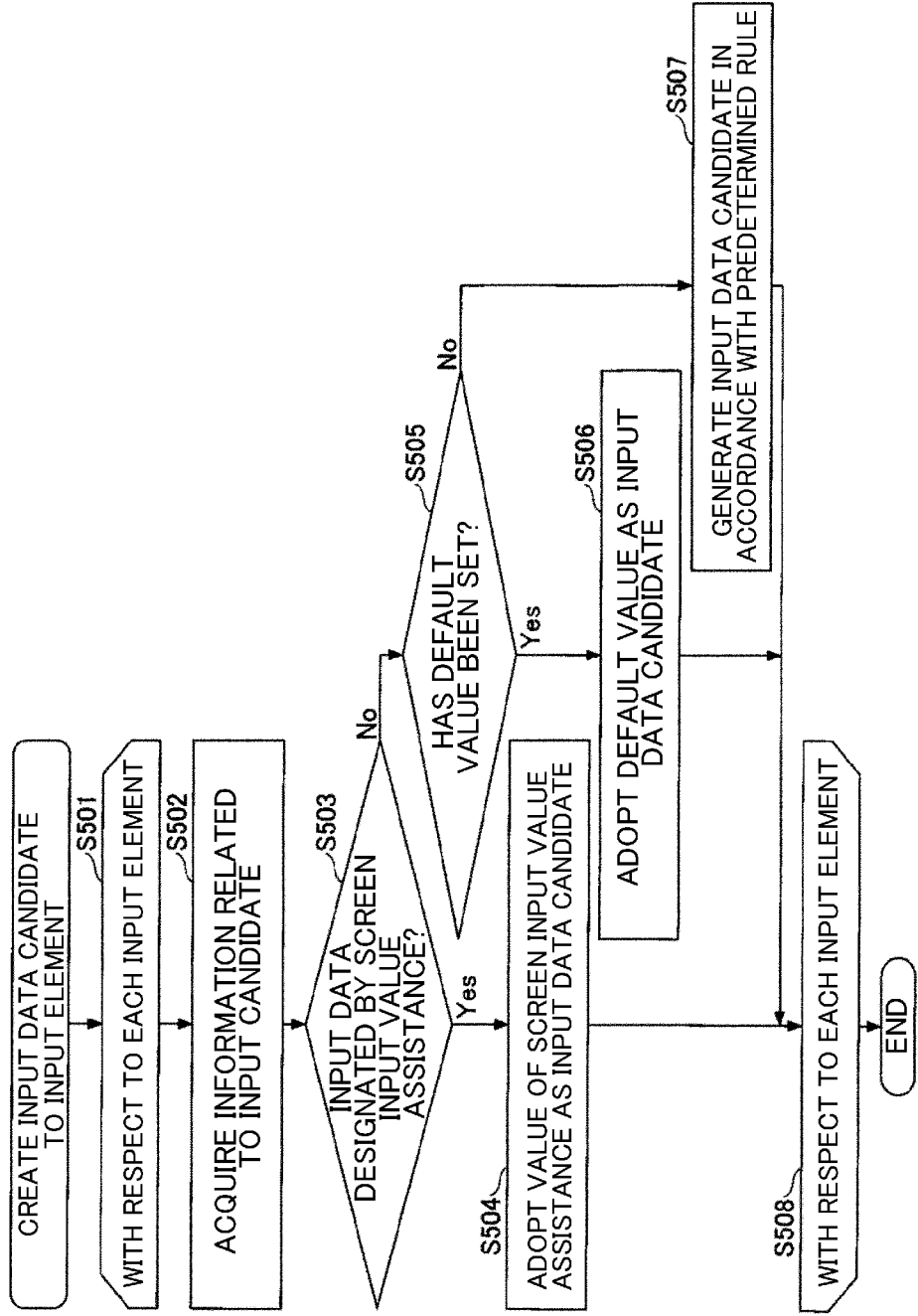
FIG. 13 is a flow chart for explaining an example of processing procedures of generation processing of input data candidates with respect to an input element.

FIG. 13 is a flow chart for explaining an example of processing procedures of generation processing of input data candidates with respect to an input element.

In steps S501 to S508, steps S502 to S507 are executed for each input element having been adopted as an input element in step S305 or step S404. Hereinafter, an input element that is a processing object will be referred to as an "object input element". In addition, an object link or an object button at the time point of step S305 or step S404 will be referred to as an "object operation element".

In step S502, the test scenario generating unit 11 acquires information related to the object input element from the object HTML. Next, based on the information, the test scenario generating unit 11 determines whether or not input data has been designated by screen input value assistance with respect to the object input element (S503). When input data has been designated (Yes in S503), the test scenario generating unit 11 adopts the input data as an input data candidate with respect to the object input element (S504).

On the other hand, when screen input value assistance has not been designated (No in S503), the test scenario generating unit 11 determines whether or not a default value is designated for the object input element based on the information acquired in step S502 (S505). A determination on whether or not a default value is set can be made as follows.

When the object input element is an input element to which a character string can be input such as a text box, a determination that a default value has been set can be made when the object input element has a value attribute, a placeholder attribute, or the like, but if not, a determination that a default value has not been set can be made. In addition, when the object input element is an input element for which one option of a plurality of options is selected such as a check box, a determination that a default value has been set can be made when the object input element has a checked attribute or the like, but if not, a determination that a default value has not been set can be made.

When a default value has been set to the object input element (Yes in S505), the test scenario generating unit 11 adopts only the default value as an input data candidate with respect to the object input element (S506). On the other hand, when a default value has not been set to the object input element (No in S505), the test scenario generating unit 11 generates an input data candidate with respect to the object input element in accordance with a predetermined rule (S507).

Additional information on screen input value assistance will be provided below.

"Toshiyuki Kurabayashi, Hiroyuki Kirinuki, Haruto Tanno: "A Proposal of Input Value Creation Support Technique for Automatic Generation of Test Scripts", IPSJ SIG Technical Report Software Engineering, vol. 2018-SE-199, no. 13, pp. 1-7, July 2018" proposes a method of "collecting information on input forms by crawling a test object in advance and automatically generating a format for designating an input value with respect to each form".

Specifically, first, when crawling an application that is a test object, information such as an id attribute and XPath (notation that uniquely specifies a position of an element on HTML) which are set to input elements of each screen is acquired and a format described in a form that is readable by a crawler (machine) is output. Subsequently, a user manually adds specific values to be entered to each input element with respect to the output format. By setting a file to which specific values have been added by the user to the crawler and once again analyzing the application, when an input element that matches the id attribute (XPath) described in the file is found, the crawler performs the analysis by entering the specific values designated by the user to the input form.

In the present embodiment, a mechanism in which the user designates a specific value to be entered to each input element such as described above is referred to as screen input value assistance.

As described above, according to the present embodiment, using characteristics of input elements and operation elements, operations with a relatively low probability of contributing toward finding a screen transition that is necessary for specification restoration are extracted and removed from automatic operation of screens. Accordingly, patterns of operations included in a test script can be reduced without reducing accuracy of specification restoration and time required for specification restoration of screen transitions of a web application can be reduced.

In the present embodiment, the client apparatus 10 represents an example of the operation pattern generation apparatus. The test scenario generating unit 11 represents an example of the generating unit.

While an embodiment of the present invention has been described in detail above, it is to be understood that the present invention is not limited to the specific embodiment and that various modifications and changes can be made within the scope of the gist of the present invention as set out in the accompanying claims.

REFERENCE SIGNS LIST

10 Client apparatus
11 Test scenario generating unit
12 Screen automatic operation unit
13 Screen evaluating unit
14 Test material generating unit
20 Server apparatus
100 Drive apparatus
101 Recording medium
102 Auxiliary storage apparatus
103 Memory apparatus
104 CPU
105 Interface apparatus
106 Display apparatus
107 Input apparatus
131 Node deleting unit
132 Node aggregating unit
133 Comparing unit
B Bus

The invention claimed is:

1. An operation pattern generation apparatus comprising a processor configured to execute operations comprising:
   retrieving code data of screens of a web application for testing, wherein the data of screens include operation elements of the screens, and the operation elements include input data with a predetermined value;
   generating a plurality of operation patterns of the web application, wherein an operation pattern of the plurality of operation patterns includes the operation elements that cause a transition between the screens of the web application and input data candidates for input elements to be used to input data on the screens, wherein the operating pattern includes the operation elements that cause the transition between screens of the web application based on only the predetermined value as a value of the input data among the input data candidates for input elements;
   automatically operating, based on the plurality of operation patterns, the web application to reconstruct a specification of the web application based on a result from the automatically operating according to reverse based engineering; and
   generating, based on the reconstructed specification of the web application, a test script for testing the web application.

2. The operation pattern generation apparatus according to claim 1, wherein
   the generating does not combine a link to which a query string has not been set among the operation elements with the input data candidates.

3. The operation pattern generation apparatus according to claim 1, wherein
   the generating includes adopting, with respect to a button among the operation elements, an input element in a form to which the button belongs as a candidate of a combination object of input data.

4. The operation pattern generation apparatus according to claim 2, wherein the generating includes adopting, with respect to a button among the operation elements, an input element in a form to which the button belongs as a candidate of a combination object of input data.

5. An operation pattern generation method, comprising
retrieving code data of screens of a web application for testing, wherein the data of screens include operation elements of the screens, and the operation elements include input data with a predetermined value;
generating a plurality of operation patterns of a web application, wherein an operating pattern of the plurality of operating patterns include operation elements that cause a transition between the screens of the web application and input data candidates for input elements to be used to input data on the screens, wherein the operating pattern includes the operation elements that cause the transition between screens of the web application based on only the predetermined value as a value of the input data among the input data candidates for input elements;
automatically operating, based on the plurality of operation patterns, the web application to reconstruct a specification of the web application based on a result from the automatically operating according to reverse based engineering; and
generating, based on the reconstructed specification of the web application, a test script for testing the web application.

6. The operation pattern generation method according to claim 5, wherein
the generating includes a link to which a query string has not been set among the operation elements is not combined with the input data candidates.

7. The operation pattern generation method according to claim 5, wherein
the generating includes, for a button among the operation elements, an input element in a form to which the button belongs is adopted as a candidate of a combination object of input data.

8. The operation pattern generation method according to claim 6, wherein
the generating includes, for a button among the operation elements, an input element in a form to which the button belongs is adopted as a candidate of a combination object of input data.

9. A system for generating an operation pattern, the system comprises a processor configured to execute a method comprising:
retrieving code data of screens of a web application for testing, wherein the data of screens include operation elements of the screens, and the operation elements include input data with a predetermined value;
generating a plurality of operation patterns of a web application, wherein an operation pattern of the plurality of operation patterns include operation elements that cause a transition between the screens of the web application and input data candidates for input elements to be used to input data on the screens, wherein the operating pattern includes the operation elements that cause the transition between screens of the web application based on only the predetermined value as a value of the input data among the input data candidates for input elements;
automatically operating, based on the plurality of operation patterns, the web application to reconstruct a specification of the web application based on a result from the automatically operating according to reverse based engineering; and
generating, based on the reconstructed specification of the web application, a test script for testing the web application.

10. The system according to claim 9, the generating does not combine a link to which a query string has not been set among the operation elements with the input data candidates.

11. The system according to claim 9, the generating includes adopting, with respect to a button among the operation elements, an input element in a form to which the button belongs as a candidate of a combination object of input data.

12. The system according to claim 10, the generating includes adopting, with respect to a button among the operation elements, an input element in a form to which the button belongs as a candidate of a combination object of input data.

* * * * *